Jan. 8, 1935.                G. DECKER                1,987,433
                         COMBUSTION CONTROL
                         Filed Aug. 7, 1931
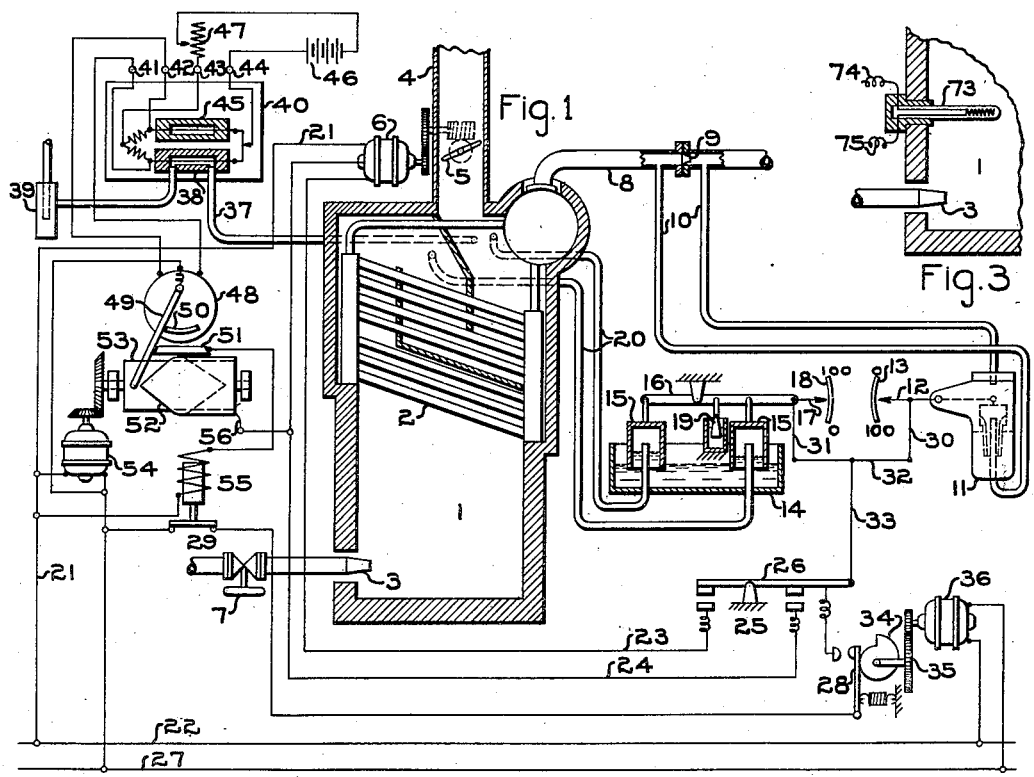
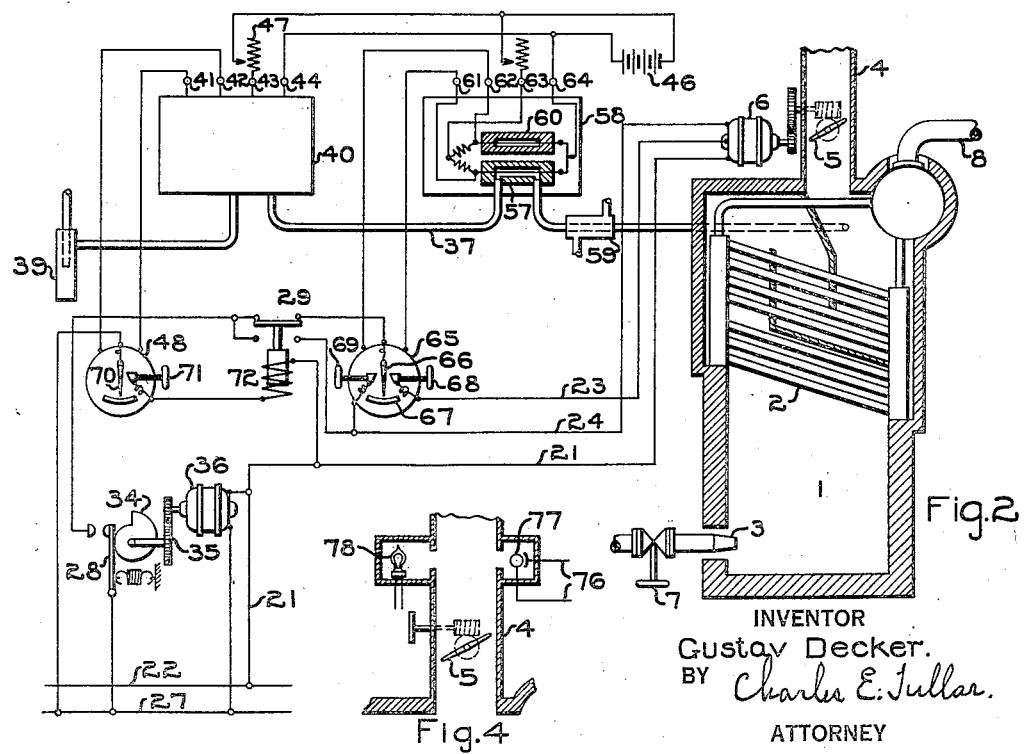
INVENTOR
Gustav Decker.
BY Charles E. Tullar.
ATTORNEY Patented Jan. 8, 1935

1,987,433

UNITED STATES PATENT OFFICE 1,987,433

COMBUSTION CONTROL

Gustav Decker, Berlin, Germany, assignor, by mesne assignments, to General Electric Company, a corporation of New York Application August 7, 1931, Serial No. 555,832
In Germany August 13, 1930

24 Claims. (Cl. 236—14)

This invention relates to improvements in automatic control of combustion in furnaces.

In the operation of commercial furnaces it is necessary to supply a predetermined excess of air over that theoretically required to completely oxidize the fuel so as to obtain most economical operation. In some furnaces, to decrease the excess air below a predetermined amount may result in the combustible constituents of the fuel not being completely oxidized, as can be ascertained by the presence of carbon monoxide, hydrogen or smoke in the gases resulting from combustion or by there being an excessive amount of combustible matter left in the refuse. In other furnaces a reduction of excess air might increase combustion efficiency, but the deterioration of the furnace or fuel burning equipment due to the higher temperatures obtained would result in less economical operation than if a higher excess air had been used.

To increase the excess air above the predetermined amount reduces combustion efficiency, as a greater percentage of the heat liberated by the oxidation of the fuel is dissipated in heating the additional air from the temperature at which such air enters the furnace to the temperature at which the gases of combustion are exhausted to the atmosphere, and consequently there is a smaller percentage of the heat available for some useful purpose such as the generation of steam in a steam boiler, etc. To operate a furnace with a greater excess of air than necessary is more economical, however, than to operate with a smaller excess of air than necessary, as the losses due to unburned fuel, deterioration of refractories, etc., are much greater than the loss due to excess air; theoretically the rate of heat loss increasing approximately fifteen times as fast for each percent deficiency of air as for each percent of excess air.

It is well known in the art to automatically control the fuel and air input to a furnace to maintain the desired excess air, using, for example, the $CO_2$ content of the gases of combustion as an index of the excess air supplied. However, for the same excess air the $CO_2$ content varies, depending upon the chemical constituents of the fuel and a control adjusted to maintain the desired excess air with fuel of a certain character and quality might maintain a deficiency of air if for some reason the character and quality of the fuel were changed. There is also the possibility, as frequently happens, that such control systems do not maintain the desired excess of air due to changes in the operating conditions of the furnace, as hereinafter more fully described; and it is therefore an object of my invention to insure economical combustion conditions by continuously determining the value of one or more of the factors which, if varied beyond a predetermined value, would result in poor economy of operation.

It is a further object to provide automatic means actuated by such factors whereby further reduction of excess air as may be called for by a primary combustion control system is prohibited when one of such factors reaches a predetermined value, and to automatically increase the ratio of air to fuel until the value of the factor is reduced below the predetermined value, whereupon the primary combustion control would again become operative.

Other objects of my invention will be apparent from the following description, taken in connection with the drawing forming a part of this specification, in which Fig. 1 is a partially diagrammatic layout of one embodiment of the invention.

Fig. 2 is a partially diagrammatic layout of a second embodiment of the invention.

Fig. 3 is a fragmentary view of a modification of an embodiment.

Fig. 4 is a further fragmentary view of a modification.

I have chosen to illustrate and will describe one preferred embodiment of my invention applied to the furnace of a steam generating boiler, in which the desired excess of air is maintained by proportioning the air admitted to the steam flow, except when the CO content of the gases of combustion reaches a predetermined value, whereupon further reduction in air will be prohibited and the ratio of air to fuel will be automatically increased at a rate depending upon the amount of CO. A second embodiment of the invention applies to a furnace of the same type, wherein the desired excess air is maintained by proportioning the air admitted in accordance with the $CO_2$ content of the gas resulting from combustion except when the CO content in the gas reaches a predetermined value whereupon further reduction in air will be prohibited and the ratio of air to fuel automatically increased at a constant rate until the CO falls below the predetermined value. I have shown further modifications in connection with limiting factors other than CO in the operation of such a furnace.

Referring first to Fig. 1, I indicate at 1 a furnace for heating a steam generating boiler 2 through the combustion within the furnace of fuel admitted through a burner 3 around which air is drawn from the atmosphere. Control of the quantity of air is by suction on the furnace, controlled through the positioning in the stack 4 of a damper 5 by a reversible means illustrated as the reversible electric motor 6.

The rate of supply of fuel and consequently of heat to the furnace may be varied by the hand valve 7 in the fuel admission line to the burner 3. Steam generated within the boiler 2 passes from the boiler through a conduit 8, in which I have shown at 9 a flow nozzle or other device such as is well known in the art, for restricting the flow to create a pressure differential bearing a known relation to the rate of flow therethrough.

At opposite sides of the flow nozzle 9 and to the conduit 8 are connected pipes 10 leading to a rate of flow meter 11, diagrammatically illustrated as having a liquid sealed bell positioned vertically, responsive to the pressure differential created by the flow nozzle 9 and so shaped that equal increments of flow of steam through the conduit 8 result in equal increments of movement of the flow meter indicating arm 12 over an index 13. The arrangement is such that with no flow of steam through the conduit 8, the indicator arm 12 is at the uppermost point of the index 13, while for maximum flow of steam through the conduit 8 the indicator arm 12 is at the lowermost point of the index 13. Such points on the index have been indicated respectively as 0 and 100.

In the embodiment being described, I desirably maintain as a primary control of combustion a regulation of the gas flow through the furnace to maintain a predetermined excess of air over that theoretically required for oxidation of the fuel. For convenience and simplicity of language in the description and claims, all gases which flow through the furnace and to and through the stack 4, including air, carbon dioxide, carbon monoxide and any other gaseous products of combustion which may in any manner reach and travel with the gas stream are generally referred to herein as "gases" or "gas flow".

It will be understood by those skilled in the art that a definite ratio exists between the rate of flow of gases and the rate of flow of steam from the boiler when a desired excess of air is present in the furnace. This is based on the consideration that each pound of steam at a given pressure and temperature contains a definite number of heat units, each pound of water entering the boiler at a given temperature likewise contains a definite number of heat units, and therefore the rate of steam generation is directly proportional to the rate of heat absorption in the boiler which in turn bears a relation to the rate at which heat is supplied to the boiler by the combustion of the fuel in the furnace. For a given excess of air a definite ratio exists between the rate of heat generation in the furnace and the rate at which the air must be supplied for oxidizing the fuel, and which in turn bears a relation to the rate of flow of gases through the boiler. There results, therefore, a relation between the rate of flow of the gases and the rate of flow of steam from the boiler, and at any given rate of steam output there will be a definite ratio between the two for most economical furnace operation.

I desirably establish a predetermined relation between rate of steam flow and rate of gas flow throughout the range of operation of the boiler, indicating both rates of flow, so that I may determine the existence of or departure from such predetermined relation. To accomplish this I make use of the pressure relation gage described and claimed in Patent No. 1,257,965 granted March 5, 1918 to E. G. Bailey. Such a gage coordinates an indication of the rate of flow of steam from the boiler with an indication of the rate of gas flow through the boiler, and may indicate the two rates of flow or record them, and in inter-relation to the end that when the indications are coincident or at the same graduation, then the desired or predetermined relation between rate of steam flow and rate of gas flow exists.

Responsive to the rate of flow of gases through the boiler to the stack 4 is provided a rate of flow meter indicated diagrammatically at 14, comprising a pair of liquid sealed bells 15 suspended from an oscillatable beam 16 having at one end an extension 17 forming an indicator arm positioned relative to an index 18. Further suspended from the beam 16 is a displacer 19 affording a variable counterbalancing means of the bell beam assembly to the end that the indicator arm 17 moves over the index 18 in increments directly proportional to the increments of rate of gas flow through the boiler between the limits of 0 and 100 representing minimum and maximum rates of gas flow.

The gas flow meter 14 is in general responsive to a pressure differential existing across certain portions of the boiler passes which form a restriction to the flow of the gases therethrough and transmitted through the pipes 20 to the underside of the bells 15 for positioning same.

In commercial usage and according to the teachings of the Bailey patent referred to, the indices 13 and 18 may be one and the same, and the indicating arms 12 and 17 move in parallelism over such index, so that when the indicator arms 12 and 17 are opposite the same indication, the desired or predetermined condition of relationship between the two flows is presumably attained. Such arrangement, however, is not essential, as the two meters may be arranged to indicate independently over separate indices, it only being essential that they are calibrated and adjusted to give desired relation between their indications when predetermined relation between the rates of flow exists, and to indicate in the desired manner a departure from such predetermined relation.

Upon departure from predetermined relation of steam flow and gas flow I desirably effect a primary control of the rate of gas flow to bring the actual relation between such flows back to the predetermined desirable relation. To accomplish this I have provided the reversible motor 6 with means for energizing the motor in one direction or the other and in varying amounts. The motor is connected by the conductor 21 with one of the power leads indicated at 22, and is further connected by the conductors 23 and 24 with the contacts of a contactor generally indicated at 25.

The contactor 25 comprises an oscillatable beam 26 pivoted between its ends and carrying at opposite sides of the pivot point mating contacts to those to which are connected the conductors 23 and 24; the arrangement being such that upon oscillation of the beam 26 around its fulcrum, one of the beam contacts is engaged for closing circuit to the conductor 23, and upon oscillation in the opposite direction of the beam 26 the other of the beam contacts is engaged for closing circuit with the conductor 24. The beam 26 is connected with the other power lead 27 through an interrupting finger 28 and a relay contact 29.

For causing a positioning of the oscillatable beam 26 I provide a relation or ratio linkage comprising a freely pivoted rod 30 suspended from the indicator arm 12 and a similar rod 31 from the indicator arm 17; the lower end of the rod 30 and the lower end of the rod 31 being inter-connected and pivoted to a crossbar 32, from a point intermediate the ends of which is suspended pivotally a further rod 33 which at its lower end is pivoted to the contact arm 26.

The arrangement is such that when the rate of flow of steam and the rate of flow of gases increase or decrease together in desired relation, the rods 30 and 31 are positioned vertically relative to each other, but the rod 33 does not change its position vertically, nor is the position of the contact arm 26 changed. If, however, the rate of flow of steam or the rate of flow of the gases varies one relative to the other out of desired or predetermined proportion, then the vertical positioning of the rod 30 relative to the rod 31 or vice versa will cause a vertical movement of the rod 33 to the end that the bar 26 will be oscillated around its fulcrum to cause a closure of circuit for rotation of the motor 6 in one direction or the other to correct the rate of gas flow relative to the rate of steam flow.

To prevent overtravel and hunting of the operation of the motor 6 I provide at the interrupting finger 28 in the electrical circuit of the motor 6 a means for periodically interrupting such circuit so that even though the contactor 25 is close circuited for rotation of the motor 6 in one direction or the other, such rotation will be by increments of a duration depending upon the shape of a cam 34 and of a frequency depending upon the gear ratio 35 and speed of a continuously running motor 36 connected directly across the power leads 22 and 27.

While the normal operating condition under which the relationship has been adjusted exists, the control system above described will maintain the predetermined excess air to insure maximum economy of operation. However, under abnormal conditions or conditions varying from those under which the adjustments were made, the control may tend to keep the two indicating arms recording the same when such relationship is actually incorrect from a desired efficiency standpoint. The control might even tend to maintain a deficiency of air over that desired, resulting in excessive losses due to CO, smoke or other combustible matter in the products of combustion, or cause an excessive furnace temperature.

For example, if the temperature of the water entering the boiler should decrease, the number of heat units absorbed in the boiler for each pound of generated steam is increased, then if a ratio of gas flow to steam flow were maintained, that under ordinary conditions gave maximum economy of operation, a deficiency of air and inefficient operation would result.

Again, excessive moisture or change in the character of the fuel might so alter combustion conditions that a maintenance of the predetermined excess air would result in smoke or rapid deterioration of the furnace walls. It has been in the past a common practice to temporarily remove the boiler from automatic control when such conditions exist, and to manually control the rate of air flow until conditions are again normal. This is uneconomical, as it is left to the judgment of an operator and frequently highly inefficient conditions are allowed to exist for a considerable length of time before they are discovered and corrected. To obviate such manual control I have provided in my invention a supplementary control to the primary control above described which under abnormal conditions takes precedence over the primary control, making such primary control ineffective until conditions are again normal.

The abnormal conditions to which my supplementary control is responsive are what I may call limiting factors, and have been illustrated in connection with unburned combustible such as carbon monoxide, hydrogen, unburned carbon, etc., as well as temperature in the furnace, which is a limiting factor of operation for an excessive furnace temperature will undoubtedly cause deterioration of the furnace walls and other equipment.

I have shown in Fig. 1 as a supplemental control, limiting and taking precedence over the primary control, an arrangement responsive to combustible in the gases such as hydrogen or carbon monoxide. A continuous sample of the gases is drawn from the last pass of the boiler through a pipe 37, a chamber 38 of a combustible gas detector, and a suitable aspirator 39. The combustible gas detector is illustrated in general at 40 as of the Wheatstone bridge type, comprising four ratio arms connected end to end in series, forming a closed ring. The joining points of the four arms are connected to the terminals 41, 42, 43 and 44 of the detector 40.

The arrangement is such that between the terminals 41, 43 lies a fixed resistance ratio arm. Between the terminals 42, 43 lies a similar fixed resistance ratio arm, although the resistance may not be of the same value as the first. Between the terminals 42, 44 lies an arm including a platinum wire extending through a chamber 45, while between the terminals 41, 44 lies a similar platinum wire through the chamber 38. Across the corners of the bridge, namely between the terminals 43, 44 is connected a battery or source of potential such as 46 in the circuit of which is indicated an adjustable resistance 47. Across the opposite corners of the bridge, namely between the terminals 41, 42 is connected a galvanometer indicated in general at 48.

The platinum wires extending through the chambers 38 and 45 have a resistance such as to maintain a temperature of substantially 800° F. in the chambers. A catalytic action ensues between the platinum wire and any combustible gases in the sample drawn through the pipe 37 by the aspirator 39 and passing through the chamber 38 to the end that there is combustion of the combustible constituents taking place with the oxygen present in the gases, and the platinum wire in the chamber 38 is heated to a higher temperature relative to the temperature of the platinum wire within the chamber 45 if such catalytic action does take place within the chamber 38. Catalytic action will occur if there are unburned combustibles in the gas sample passing through the chamber, and the temperature of this arm of the bridge is therefore adapted to vary, and correspondingly vary its resistance relative to the arm which passes through the chamber 45, thereby unbalancing the bridge and resulting in current flow through the galvanometer 48. The galvanometer may be of any suitable type having a movable coil or equivalent device to which a contact arm 49 may be secured to move as an indicator of the presence and amount of combustible within the gas sample flowing through the chamber 38.

The indicator arm 49 of the galvanometer 48 is shown as cooperating with an index 50 which may be graduated in percent of carbon monoxide or otherwise as desired. It further is adapted to engage a contact strip 51 and a contact plate 52, the latter positioned about a cylinder 53. The cylinder 53 is arranged for continual rotation by a motor 54 connected directly across the power leads 22, 27. The contact plate 52 is of any desirable shape wherein upon rotation of the cylinder 53 contacting engagement between the arm 49 and the plate 52 is of increments of amounts depending both upon the position of the arm 49 and upon the shape of the plate 52.

The contacting indicating arm 49 is connected directly to the power lead 27, while the contact strip 51 is connected to the power lead 22 through a solenoid 55 adapted upon energization to open circuit the contacts 29 previously referred to. The contact plate 52 through brush 56 is continuously connected to the conductor 24 which is the conductor for causing an opening of the damper 5.

It will be seen that with the arrangement described I have a primary control of the supply of air to the furnace through a positioning of the damper 5 to control the gas flow through the boiler to maintain a predetermined desirable relation between the rate of steam flow from the boiler and rate of gas flow through the boiler, be the operation of the boiler relatively great or small. Should the relation between steam flow and gas flow vary from that desired, I cause a positioning of the damper 5 to return the relationship to that desired, and the electrical contacts which I cause to be made for operation of the motor 6 in one direction or the other are of intermittent nature to prevent overtraveling or hunting.

I provide a supplementary control, normally inactive, which, however, becomes effective for limiting the primary control and taking precedence over said primary control when a certain factor or factors in the operation of the furnace exceed a predetermined value. For example, if the percentage of combustible gases such as carbon monoxide or hydrogen in the gases passing through the boiler increases above a predetermined amount, the indicating contacting arm 49 of the galvanometer 48 moves in a counterclockwise direction, closing circuit between such arm and a contact strip 51 for energization of a solenoid 55. Such energization opens circuit of the contact 29 whereby the primary control through the contactor 25 is made ineffective upon the motor 6. Simultaneously or later, if desired, the contacting arm 49 engages the contact plate 52 upon rotation of the drum 53 to close circuit between the power lead 27 and the conductor 24 for energization of the motor 6 in a direction tending to increase the rate of flow of gases through the boiler, and correspondingly the percentage of excess air in the furnace 1. It will be particularly noted that such actuation is shown for energization of the motor 6 and operation of the damper 5 in an increase direction only, so that when the limiting factor such as percentage of combustible present in the gases shows up or exceeds a predetermined value, there results an increase in the amount of air supplied the furnace, regardless of whether the primary control had previously been calling for an increase or a decrease of such air.

The energization of the motor 6 through the instrumentality of the galvanometer 48 may be arranged to depend in amount and frequency of impulse upon the percentage of combustible as indicated by the angular movement of the arm 49 and the shaping of the contact plate 52.

Furthermore, as illustrated, when the percentage of combustible again decreases, the arm 49 moves in a clockwise direction until at a predetermined position it breaks circuit for the solenoid 55, re-establishing the primary control.

In Fig. 2 I have shown a further embodiment of my invention, and in the illustration and description thereof will refer by the same numerals to like parts of Fig. 1 and Fig. 2. In this embodiment, in place of comparing the rate of steam flow to the rate of gas flow as an indication of desired condition, I use a measure of the carbon dioxide content in the gases to operate my primary control, and again employ an indication of the combustible in the gases to operate my supplementary control. It is well known to those skilled in the art that for a given fuel a certain percentage of $CO_2$ in the gases of combustion indicates that a definite percentage of air over that theoretically required for combustion of the fuel was supplied the furnace. Such a control from percentage of $CO_2$ under normal conditions would operate satisfactorily, but for reasons hereinbefore described and under abnormal conditions, it might operate to cause a deficiency of air resulting in highly uneconomical operation.

I have shown the sampling pipe 37 through which is aspirated continuously a sample of the gases as passing through a chamber 57 of a $CO_2$ detector 58 on its way to the chamber 38 of the combustible detector 40. To avoid the effect of the inherent temperature of the gases aspirated through the sample pipe 37 I surround the sample pipe with a cooling jacket 59 of any convenient type ahead of the chamber 57 so that when the gases of the continuous sample pass through the chamber 57 they are at a comparatively low temperature.

The $CO_2$ detector 58 comprises a Wheatstone bridge arrangement very similar to that of the combustible detector 40, except that I maintain the platinum wires at relatively lower temperatures than in the device 40 so that catalytic action does not take place between the combustible constituents of the gases in passing through the chamber 57. Trapped in the chamber 60 through which extends a platinum wire similar to that passing through the chamber 57, is a quantity of air having a definite thermal conductivity. As is well known, the thermal conductivity of the gases leaving a furnace is proportional to the $CO_2$ content, and as a sample of these gases passes through the chamber 57, a lesser or greater amount of heat will be conducted from the platinum wire therein, thus raising or lowering the temperature of the wire and consequently the resistance of that arm of the bridge, with the result that a current proportional to the temperature and consequently bearing a definite relation to the percentage of $CO_2$ will be effective at the terminals 61, 62 for actuation of the galvanometer 65.

The galvanometer 65 has an indicating contacting arm 66 adapted to be positioned relative to an index 67 to continuously indicate the percentage of $CO_2$ in the sample being drawn from the gases and further adapted at a predetermined low percentage of $CO_2$ to engage and contact with an adjustable contact point 69, and at a predetermined high percentage of $CO_2$ to engage and contact with an adjustable contact point 68.

The combustible detector 40 as in Fig. 1 is adapted to actuate an indicating contacting arm 70 upon the presence of and in proportion to the amount of combustible contained in the gases, whereby at a predetermined combustible content the indicating contacting arm 70 engages an adjustable contact point 71 for energization of a solenoid 72.

Energization of the solenoid 72 breaks the contact 29 and transfers control from the galvanometer 65 to the galvanometer 48 by connecting the power lead 27 to the conductor 24 by means of the solenoid 72 for an intermittent actuation of the motor 6 and positioning of the damper 5 in an opening direction so long as the contacting arm 70 of the galvanometer 48 engages the adjustable contact 71. The intermittent action is accomplished through periodic rotation of the cam 34 for closing the contact 28.

It will be seen that in operation Fig. 2 resembles the operation of Fig. 1 except that the primary control of Fig. 2 is from a percentage of $CO_2$ in the gases, and further, that the supplemental control from combustible indication is by equal increments through the medium of the interrupting finger 28 regardless of the amount or percentage of such combustible in the gases. In this embodiment, however, as in the one illustrated in Fig. 1, a primary control is effected which is limited and taken precedence over by a supplemental control working from a factor whose variations from a predetermined value would tend to cause uneconomical operation.

I illustrate in Fig. 3 a fragmentary corner of the furnace 1 wherein I have shown positioned a thermocouple 73 sensitive to temperature within the furnace and having conductor leads 74 and 75. In connection with some furnaces, as hereinbefore discussed, upon a change in operating conditions or a variation in the chemical constituents of the fuel, rapid deterioration of the furnace follows, decreasing the economy of operation, and it is desirable in such cases to increase the ratio of rates of gas flow to fuel feed to the furnace. By thus increasing the amount of excess air passing through the furnace and cooling the furnace, a predetermined maximum temperature is never exceeded. I may therefore make the Wheatstone bridge illustrated in Fig. 1 and Fig. 2 at 40, sensitive not to the amount of combustible in the gases but to furnace temperature as a limiting factor, wherein the platinum wire forming the arm of the bridge between the terminals 41, 44 is replaced by the thermocouple between the conductor leads 74, 75 and wherein the platinum wire between the terminals 42, 44 is replaced by a fixed resistance in accordance with the desired maximum temperature.

In such an arrangement the furnace temperature would actuate the supplemental control to limit the primary control and take precedence over such primary control until the furnace temperature had again been returned below its predetermined value.

In Fig. 4 I illustrate a third embodiment of my invention wherein the limiting factor is the percentage of smoke or density of the smoke passing through the stack 4 as indicated by current in the conductors 76 as controlled by a photo-electric cell 77 sensitive to the varying light reaching the cell from a constant source of illumination 78, such illumination effective through the gases passing therebetween through the stack 4.

It will be apparent to those familiar with the art that the conductors 76 may be substituted in the circuit of the Wheatstone bridge 40 and that a fixed resistance may be substituted for the platinum wire within the chamber 45 to the end that the supplemental control will respond to a departure beyond a predetermined amount or percentage of opaqueness of the gases passing up the stack 4.

It is to be distinctly understood that while I have illustrated and described certain preferred embodiments of my invention and certain mechanical and electrical or other ways of performing them, that I am not to be limited thereby except as claimed hereinafter in view of prior art.

What I claim as new and desire to secure by Letters Patent of the United States, is:

1. The combination with a furnace, of a draft regulating device, normally operative means responsive to a condition of furnace efficiency for positioning said device, normally inoperative means responsive to a second condition of furnace efficiency for also positioning said device, and means effective upon departure of said second condition beyond a predetermined value for making ineffective said first-named means and for making effective said second-named means, said normally inoperative means adapted to position said device by unequal increments of amounts varying with amount of departure of the second condition beyond the predetermined value.

2. The combination with a furnace, of a draft regulating device, normally operative means responsive to a condition of furnace efficiency for positioning said device, normally inoperative means responsive to a second condition of furnace efficiency for also positioning said device, and means effective upon departure of said second condition beyond a predetermined value for making ineffective said first-named means and for making effective said second-named means, said normally inoperative means adapted to position said device by unequal increments of amounts varying with amount of departure of one of the conditions beyond the predetermined value, and the normally operative means adapted to position the device intermittently by equal increments.

3. The combination with a furnace, of a regulating device for varying the rate of feed of an element of combustion to the furnace, a plurality of means each responsive to a condition of furnace efficiency and each adapted to position the device, and means effective upon departure of one of said conditions beyond a predetermined value for allowing its associated means to take precedence over another of the plurality of means and cause a positioning of the device at a rate proportional to the amount of departure of the condition beyond the predetermined value.

4. The combination with a furnace, of a regulating device for varying the rate of feed of an element of combustion to the furnace, a plurality of means each responsive to a condition of furnace efficiency and each adapted to position the device, and means effective upon departure of one of said conditions beyond a predetermined value for allowing its associated means to take precedence over another of the plurality of means and cause a positioning of the device by increments of amounts proportional to the amount of departure of the condition beyond the predetermined value.

5. In combination, a furnace having fuel supplying means and air supplying means, regulating means of the gases leaving the furnace, means responsive to a measure of the excess air passing through the furnace for positioning said regulating means, means responsive to a measure of the unburned fuel for positioning said regulating means, and means effective upon departure of the measure of the unburned fuel from a predetermined value for making ineffective the means responsive to a measure of excess air.

6. In combination, a furnace having fuel supplying means and air supplying means, regulating means of the rate of air supply, means responsive to a measure of the excess air passing through the furnace for positioning said regulating means, means responsive to a measure of a variable factor of furnace operation for positioning the regulating means, and means effective upon departure of the last-named measure from a predetermined value for making ineffective the means responsive to a measure of the excess air.

7. In combination, a furnace having fuel supplying means and air supplying means, regulating means of the rate of air supply, means responsive to a measure of the excess air passing through the furnace for positioning said regulating means, means responsive to a measure of furnace temperature for positioning the regulating means, and means effective upon departure of the last-named measure from a predetermined value for making ineffective the means responsive to a measure of the excess air.

8. In combination, a furnace having fuel supplying means and air supplying means, regulating means of the rate of air supply, means responsive to a measure of the excess air passing through the furnace for positioning said regulating means, means responsive to a measure of the magnitude of a condition of the gases leaving the furnace for positioning the regulating means, and means effective upon departure of the last-named measure from a predetermined value for making ineffective the means responsive to a measure of the excess air.

9. In combination, a furnace having fuel supplying means and air supplying means, regulating means of the rate of air supply, means responsive to a measure of the excess air passing through the furnace and adapted to position said regulating means intermittently by increments and upon departure of excess air from a predetermined value, means responsive to a measure of a variable factor of furnace operation and adapted to position said regulating means by increments proportional to the rate of departure of the factor from a predetermined value, and means effective during departure of said last-named measure from its predetermined value for making ineffective the means responsive to a measure of the excess air.

10. In combination, a vapor generator having a furnace, fuel supplying means for the furnace, air supplying means for the furnace, a regulator of the rate of air supplied to the furnace, a meter of the vapor output of the vapor generator, a meter of the gases leaving the furnace, ratio determining means for comparing the indications of the meters, control means effective upon a departure of said ratio from a predetermined value for positioning said regulator, other control means responsive to the presence of unburned combustible in the gases leaving the vapor generator for positioning said regulator, and means for making ineffective said control means and for making effective said other control means when unburned combustible is present in the gases leaving the vapor generator.

11. A control system for a steam boiler having a furnace and fuel and air supplying means for the furnace, comprising in combination, regulating means for controlling the supply of air to the furnace, a steam flow meter, a gas flow meter, ratio determining means of the steam flow and gas flow, electric means effective upon departure of said ratio from a predetermined value for positioning said regulating means, an interrupter in the electric circuit whereby the positioning of the regulating means is by increments rather than continuous, a Wheatstone bridge circuit having one arm under the heating influence of catalytic action of combustible gases contained in a continuous sample of the gases leaving the boiler and passed around the heated resistance wire of the arm to cause a variation in resistance of the arm bearing a relation to combustible content in the gas sample, a galvanometer controlled by the bridge and adapted to complete electric circuits upon the presence of combustible gas in the gases leaving the boiler, one circuit so completed serving to make ineffective the ratio determining means, and another circuit intermittently completed, serving to position said regulating means at a rate proportional to the amount of combustible present in the gases leaving the boiler as indicated by said sample.

12. In a control system for a steam boiler having a furnace and fuel and air supplying means for the furnace, comprising in combination, regulating means for controlling the supply of air to the furnace, a Wheatstone bridge circuit wherein one arm is subjected to thermal conductivity effect of $CO_2$ leaving the boiler, an indicator positioned by said bridge circuit to show the departure of $CO_2$ in amount and direction from a predetermined value, said indicator adapted upon a decrease in $CO_2$ relative to the predetermined value to cause a positioning of the regulating means in one direction and upon an increase in $CO_2$ relative to the predetermined value to cause a positioning of the regulating means in the other direction, the positioning in either direction being by increments, a second Wheatstone bridge circuit wherein one arm is subjected to catalytic heating effect of combustible in the gases leaving the boiler, and a second indicator positioned by said second bridge circuit to show the presence of combustible gases leaving the boiler, said second indicator adapted upon movement indicating the presence of combustible gases to cause a positioning of the regulating means in one direction and by increments and to simultaneously make ineffective the first indicator upon said regulating means.

13. In an automatic control system for a vapor generator the combination of means for obtaining a measure of the vapor output from said generator, means for obtaining a measure of the air supplied said generator, means for determining the ratio between said measures, means controlled by said ratio determining means to maintain a predetermined ratio between the rate of air supply and vapor output, and means to modify that ratio in response to variations in a measure of furnace efficiency.

14. In an automatic control system for a vapor generator the combination of means for obtaining a measure of the vapor output from said generator, means for obtaining a measure of the air supplied said generator, means for determining the ratio between said measures, means controlled by said ratio determining means to maintain a predetermined ratio between the rate of air supply and vapor output, and means to modify that ratio in response to variations in unburned combustible.

15. In an automatic control system for a vapor generator the combination of means for obtaining a measure of the vapor output from said generator, means for obtaining a measure of the air supplied said generator, means for determining the ratio between said measures, means controlled by said ratio determining means to maintain a predetermined ratio between the rate of air supply and vapor output, and means to modify that ratio in response to variations in CO content of the gaseous products of combustion.

16. In an automatic control system for a vapor generator the combination of means for obtaining a measure of the vapor output from said generator, means for obtaining a measure of the air supplied said generator, means for determining the ratio between said measures, means controlled by said ratio determining means to maintain a predetermined ratio between the rate of air supply and vapor output, and means to modify that ratio in response to variations in furnace temperature.

17. In combination, a furnace having fuel supplying means and air supplying means, regulating means of the rate of air supply, means responsive to a measure of the excess air passing through the furnace for positioning said regulating means, means responsive to a measure of the CO in the gaseous products of combustion for positioning the regulating means, and means effective upon departure of the last-named measure from a predetermined value for making ineffective the means responsive to a measure of the excess air.

18. In combination, a furnace having fuel supplying means and air supplying means, regulating means of the rate of air supply, means responsive to a measure of the excess air passing through the furnace for positioning said regulating means, means responsive to a measure of the unburned combustible for positioning the regulating means, and means effective upon departure of the last-named measure from a predetermined value for making ineffective the means responsive to a measure of the excess air.

19. The combination with a furnace of a regulating device for varying the rate of feed of an element of combustion, means responsive to a measure of the excess air passing through the furnace for positioning said device, means responsive to a measure of another variable factor of furnace operation for positioning the device, and means effective upon departure of the last-named measure from a predetermined value for making ineffective the means responsive to a measure of the excess air.

20. The combination with a furnace, of a regulating device for varying the rate of feed of an element of combustion, normally operative means responsive to a condition of furnace efficiency for positioning said device, normally inoperative means responsive to a second condition of furnace efficiency for also positioning said device, and means effective upon a departure of said second condition beyond a predetermined value for making ineffective said first-named means and for making effective said second-named means, said normally operative means adapted to position said device intermittently by increments.

21. The combination with a furnace of a regulating device for varying the rate of feed of an element of combustion, normally operative means responsive to a condition of furnace efficiency for positioning said device, normally inoperative means responsive to a second condition of furnace efficiency for also positioning said device, and means effective upon departure of said second condition beyond a predetermined value for making ineffective said first-named means and for making effective said second-named means, said normally inoperative means adapted to position said device by unequal increments of amounts varying with amount of departure of the second condition beyond the predetermined value.

22. The combination with a furnace of a draft regulator, means responsive to an indication of the products of combustion for positioning the regulator, means responsive to an indication of the presence of one of the elements of combustion in the flue gases for positioning the regulator, and means effective upon departure of the second-named means beyond a predetermined value for making the first-named means ineffective.

23. The combination with a furnace of a draft regulator, means responsive to variations in the products of combustion for positioning the regulator, means responsive to variations in one of the elements of combustion present in the flue gases for positioning the regulator, and means effective upon departure of the second-named means beyond a predetermined value for making the first-named means ineffective.

24. The combination with a furnace of a regulator for one of the elements of combustion supplied to the furnace, means responsive to variations in the products of combustion for positioning the regulator, means responsive to variations in one of the elements of combustion present in the flue gases for positioning the regulator, and means effective upon departure of the second-named means beyond a predetermined value for making the first-named means ineffective.

GUSTAV DECKER.